(12) United States Patent
Bonhomme

(10) Patent No.: US 9,341,487 B2
(45) Date of Patent: May 17, 2016

(54) AUTOMATIC GEOFENCE DETERMINATION

(71) Applicant: Lytx, Inc., San Diego, CA (US)

(72) Inventor: Jerome Bonhomme, La Mesa, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 14/336,874

(22) Filed: Jul. 21, 2014

(65) Prior Publication Data

US 2016/0003627 A1 Jan. 7, 2016

Related U.S. Application Data

(60) Provisional application No. 62/020,019, filed on Jul. 2, 2014.

(51) Int. Cl.
*G01C 21/26* (2006.01)

(52) U.S. Cl.
CPC ........................................ *G01C 21/26* (2013.01)

(58) Field of Classification Search
CPC ........... G08G 1/20; G05B 19/18; G01C 21/26
See application file for complete search history.

(56) References Cited

U.S. PATENT DOCUMENTS

| | | | | |
|---|---|---|---|---|
| 8,269,617 B2 * | 9/2012 | Cook | ........................ | B60Q 1/00 340/439 |
| 8,755,824 B1 | 6/2014 | Wang et al. | | |
| 8,996,234 B1 * | 3/2015 | Tamari | ..................... | G08G 1/20 701/123 |
| 2008/0258890 A1 * | 10/2008 | Follmer | ................ | B60R 25/102 340/439 |
| 2010/0017126 A1 | 1/2010 | Holcman et al. | | |
| 2010/0070175 A1 * | 3/2010 | Soulchin | ................. | G06T 17/05 701/414 |
| 2010/0085193 A1 * | 4/2010 | Boss | ........................ | H04N 5/76 340/573.1 |
| 2010/0203901 A1 | 8/2010 | Dinoff et al. | | |
| 2011/0161116 A1 * | 6/2011 | Peak | .................... | G06Q 10/067 705/4 |
| 2013/0297175 A1 * | 11/2013 | Davidson | ............... | G07B 15/06 701/99 |
| 2013/0304248 A1 * | 11/2013 | Lange | .................... | G05B 19/18 700/175 |
| 2014/0121958 A1 | 5/2014 | Schenken et al. | | |
| 2014/0180576 A1 | 6/2014 | Lamarca et al. | | |
| 2014/0222298 A1 * | 8/2014 | Gurin | ....................... | G08G 1/20 701/49 |
| 2014/0279707 A1 * | 9/2014 | Joshua | ............... | G06Q 30/0283 705/400 |

\* cited by examiner

*Primary Examiner* — James Trammell
*Assistant Examiner* — James E Stroud
(74) *Attorney, Agent, or Firm* — Van Pelt, Yi & James LLP

(57) ABSTRACT

A system for automatic geofence determination comprises an interface and a processor. The interface is configured to receive data for one or more trips. A processor is configured to determine a set of nodes for each trip, determine a set of clusters using the set of nodes for each trip, and determine a set of geofences based at least in part on the set of clusters. A node of the set of nodes is determined based at least in part on the data. A cluster is a group of nodes separate from another group of nodes.

20 Claims, 8 Drawing Sheets

AUTOMATIC GEOFENCE DETERMINATION

CROSS REFERENCE TO OTHER APPLICATIONS

This application claims priority to U.S. Provisional Patent Application No. 62/020,019 entitled AUTOMATIC GEOFENCE DETERMINATION filed Jul. 2, 2014 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. A vehicle event recorder for cars and trucks (e.g., vehicles that operate on public roads) typically includes road map data comprising location-specific information (e.g., speed limit information, traffic control information, vehicle depot information, vehicle boundary information, etc.). Location-specific information can cause the rules defining when an event is detected to change based on location (e.g., speed limit laws change in different regions; while in a vehicle depot seat belts are not required to be fastened; if the vehicle leaves a vehicle boundary an event is detected; etc.). However, programming a vehicle event recorder with location-specific information can be a complex, arduous, and error-prone process.

BRIEF DESCRIPTION OF THE DRAWINGS

Various embodiments of the invention are disclosed in the following detailed description and the accompanying drawings.

DETAILED DESCRIPTION

Figure 1:
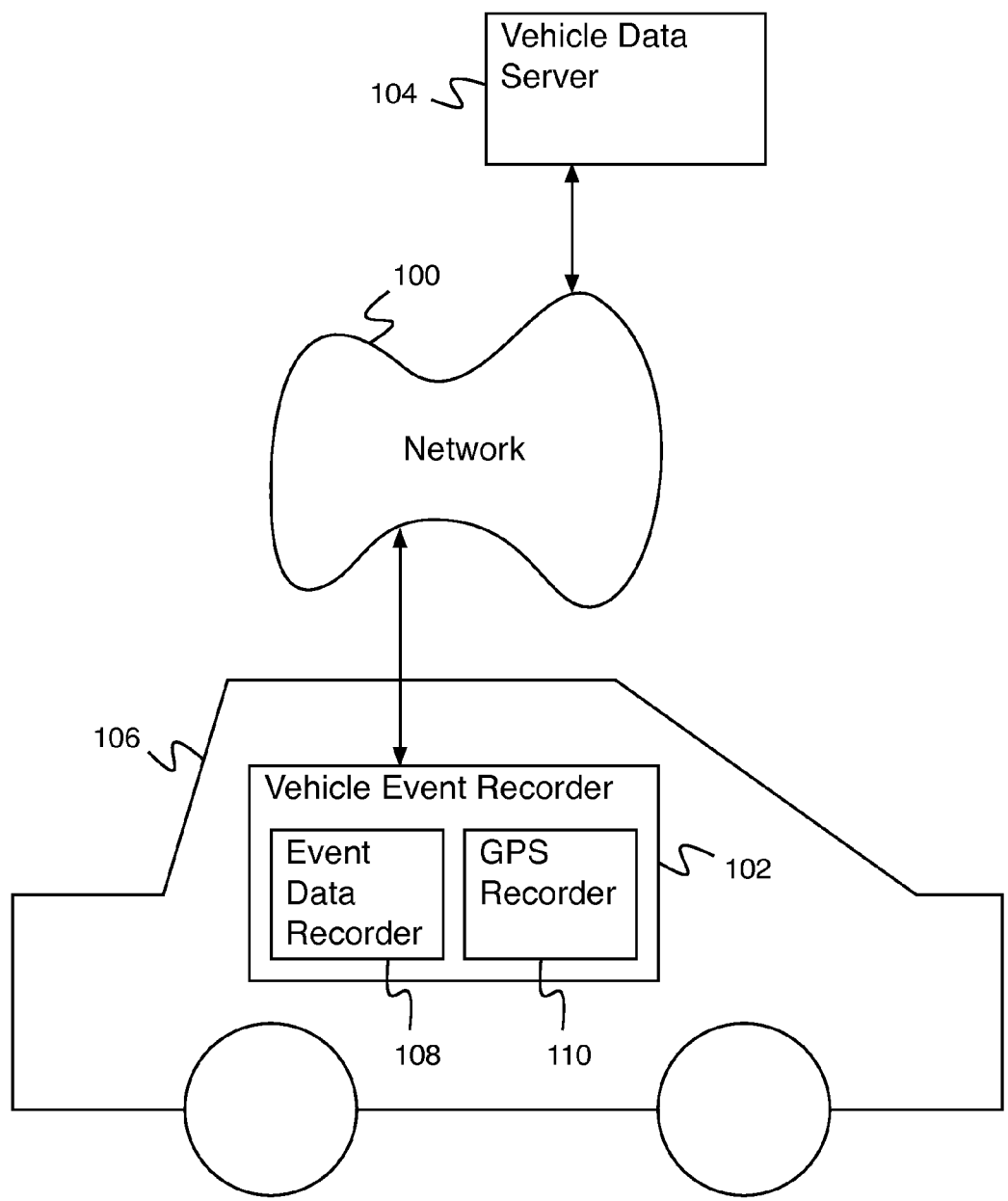
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatic geofence determination comprises an interface configured to receive data for one or more trips. The system for automatic geofence determination additionally comprises a processor configured to determine a set of nodes for each trip, wherein a node of the set of nodes is determined based at least in part on the data; determine a set of clusters using the set of nodes for each trip, wherein a cluster is a group of nodes separate from another group of nodes; and determine a set of geofences based at least in part on the set of clusters. The system for automatic geofence determination additionally comprises a memory coupled to the processor and configured to provide the processor with instructions.

In some embodiments, a system for automatic geofence determination comprises an interface configured to receive position data for one or more trips. The system for automatic geofence determination additionally comprises a processor configured to add each trip to a perimeter, extend the perimeter by a boundary region, and determine a geofence based at least in part on the perimeter. The system for automatic geofence determination additionally comprises a memory coupled to the processor and configured to provide the processor with instructions.

A system for automatic geofence determination is disclosed. A geofence comprises a software boundary indicating a change of location-specific information. Geofences delineate regions with distinct speed limits or other legal rules, safety rules, insurance rules, fleet-specific rules, or any other appropriate rules. For example, a geofence is used to delineate a truck depot that a commercial truck returns to at the end of each day. The truck depot geofence can be used to indicate a change of legal rules, e.g., seat belts are not required to be worn in the truck depot, the speed limit within the truck depot is 5 MPH regardless of the legal limit on the nearest street, the truck is not allowed to be outside the truck depot after 9 PM or before 7 AM, etc. A geofence typically can also be used to designate a legal vehicle perimeter (e.g., if the vehicle leaves the legal vehicle perimeter at any time an anomalous event is generated).

In some embodiments, it is desired to generate a set of geofences designating a set of truck route stops (e.g., a truck depot and all of the destinations along the route of the truck). A system for automatic geofence determination receives data describing a set of trips (e.g., a set of trips along the route of the truck). In various embodiments, the data describing a set of trips comprises GPS data, vehicle event data, or any other appropriate data. The system then determines a set of nodes for each trip. The set of nodes for each trip comprises the set of locations that the vehicle stopped. In some embodiments, it is determined that a vehicle stopped using vehicle event data (e.g., a door open signal, an ignition off signal, a speedometer measures zero speed signal, etc.). In some embodiments, it is determined that a vehicle stopped using GPS data (e.g., determining that the GPS data indicates that the vehicle speed is equal to zero). The sets of nodes for each trip are merged into one overall set of nodes, and the overall set of nodes is used to determine a set of clusters. In some embodiments, before clustering, nodes are discarded where a reason for the vehicle stop other than a vehicle route stop (e.g., a stop sign, a stop light, heavy traffic, etc.) can be determined. In some embodiments, a cluster comprises a group of nodes separate from another group of nodes. In various embodiments, cluster boundaries are determined in regions where the distance between two nodes is above a threshold, where the node density drops below a threshold, where the node density forms an inflection point, or at any other appropriate region. A set of geofences is then determined based at least in part on the set of clusters. In some embodiments, a geofence is drawn around each cluster. In some embodiments, a boundary region is added to the geofence surrounding each cluster. In some embodiments, a geofence is only drawn around clusters comprising at least a threshold number of nodes (e.g., only clusters including nodes from at least 50% of trips receive a geofence, only clusters including at least five nodes receive a geofence, etc.).

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 comprises a system for detecting risky behavior. In some embodiments, vehicle event recorder 102 comprises a system for determining geofences. Vehicle event recorder 102 comprises event data recorder 108 and GPS recorder 110. In some embodiments, event data recorder 108 includes or is in communication with a set of sensors—for example, video recorders, audio recorders, accelerometers, gyroscopes, vehicle state sensors, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, event data recorder 108 comprises a system for processing sensor data and detecting events. GPS recorder 110 comprises a GPS recorder for recording GPS data. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a CDMA network, a GSM network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, vehicle data server 104 stores information from multiple vehicles, multiple sets of vehicles (e.g., fleets, services, groups, etc.), etc. In various embodiments, vehicle data server 104 comprises a server located at a business location, at a service provider location, at a cloud hosting provider location, or any other appropriate location.

Figure 2:
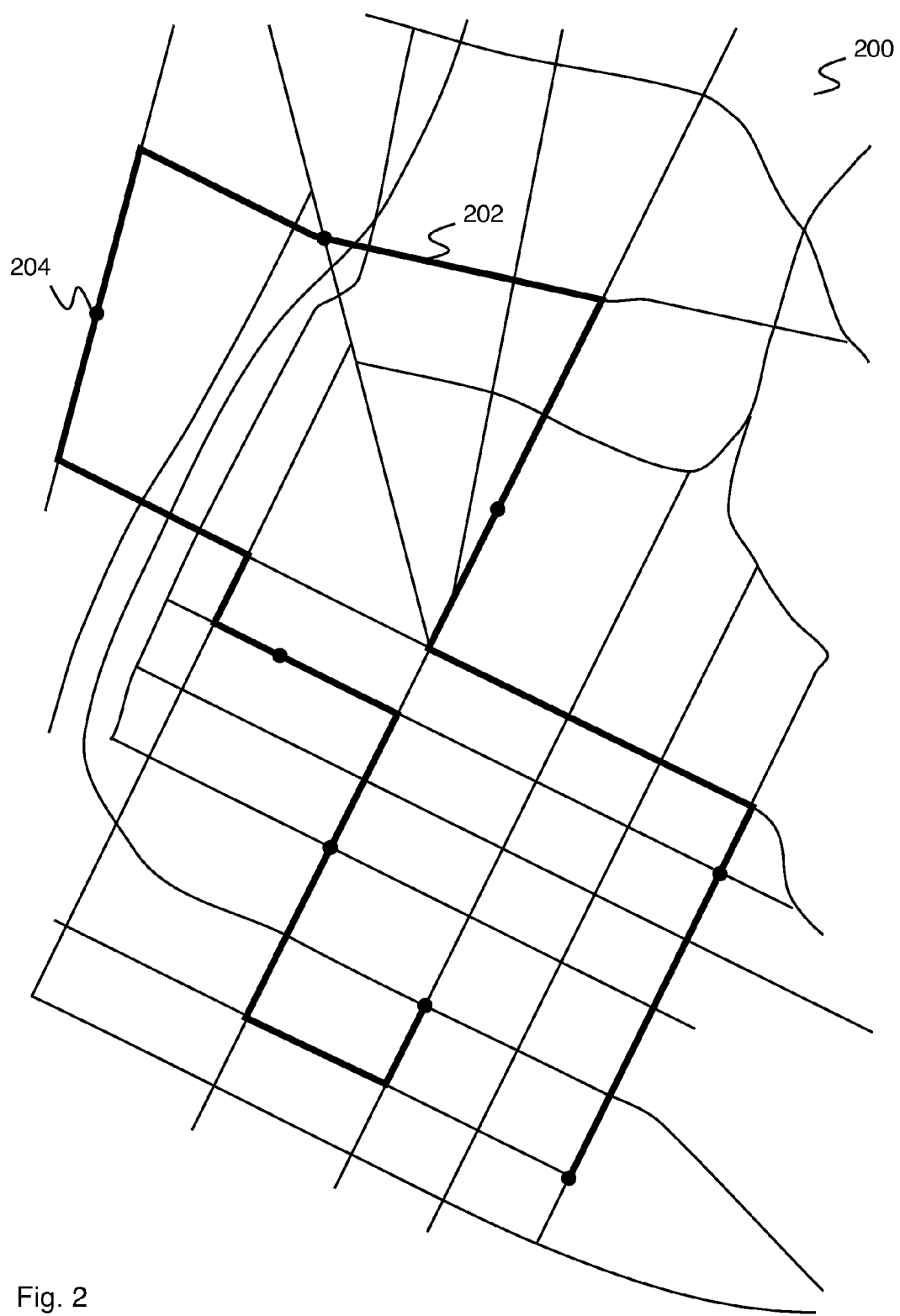
FIG. 2 is a diagram illustrating an embodiment of a map illustrating GPS data and event data.

FIG. 2 is a diagram illustrating an embodiment of a map illustrating GPS data and event data. In the example shown, map 200 comprises a map of a city (e.g., illustrating possible paths for a commercial vehicle to drive). Map 200 illustrates GPS data (e.g., on GPS data line 202) and event data (e.g., event data marker 204). In some embodiments, GPS data and event data were recorded by an event data recorder and an GPS recorder on a vehicle event recorder (e.g., vehicle event recorder 102 of FIG. 1). GPS data line 202 shows a vehicle path from when the ignition was turned on until when the ignition was turned off. In some embodiments, event data markers (e.g., event data marker 204) show locations where vehicle events were recorded by a vehicle event recorder. In various embodiments, vehicle events comprise vehicle stop events, vehicle ignition on/off events, collision events, vehicle performing outside of specification events, or any other appropriate events.

Figure 3:
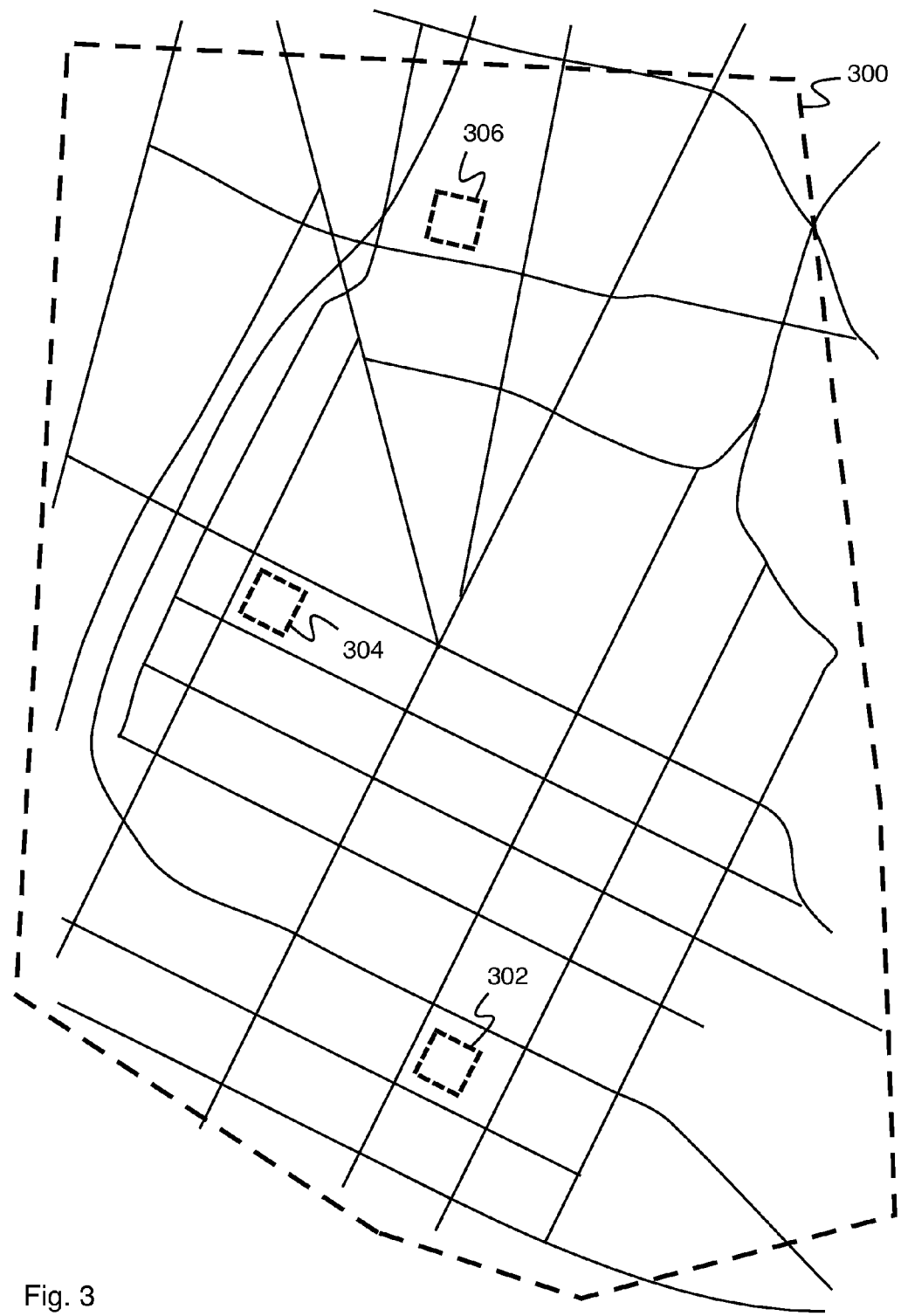
FIG. 3 is a diagram illustrating an embodiment of a map illustrating geofences.

FIG. 3 is a diagram illustrating an embodiment of a map illustrating geofences. In some embodiments, the map of FIG. 3 comprises map 200 of FIG. 2 with geofences shown. In some embodiments, geofences comprises boundaries demarcating an event detector rules change. In the example shown, geofence 300 comprises a perimeter geofence. A perimeter geofence comprises a geofence indicating the outer boundary of the region a vehicle is allowed to drive in. In some embodiments, a vehicle event recorder detects an event if the vehicle exits the perimeter geofence. In some embodiments, a perimeter geofence is determined in part by taking the union of all legal trips of a predetermined set of trips by a vehicle or a set of vehicles and adding a boundary region. Geofence 302, geofence 304, and geofence 306 comprise location geofences. In some embodiments, a location geofence comprises a geofence indicating a specific location of interest for a vehicle (e.g., a yard, a delivery location, a repair location, etc.). In some embodiments, a vehicle event recorder changes rules, thresholds, etc. while the vehicle is within the location geofence. In some embodiments, a location geofence is determined in part by locating a cluster of event location (e.g., stopping locations) over a predetermined set of trips.

Figure 4:
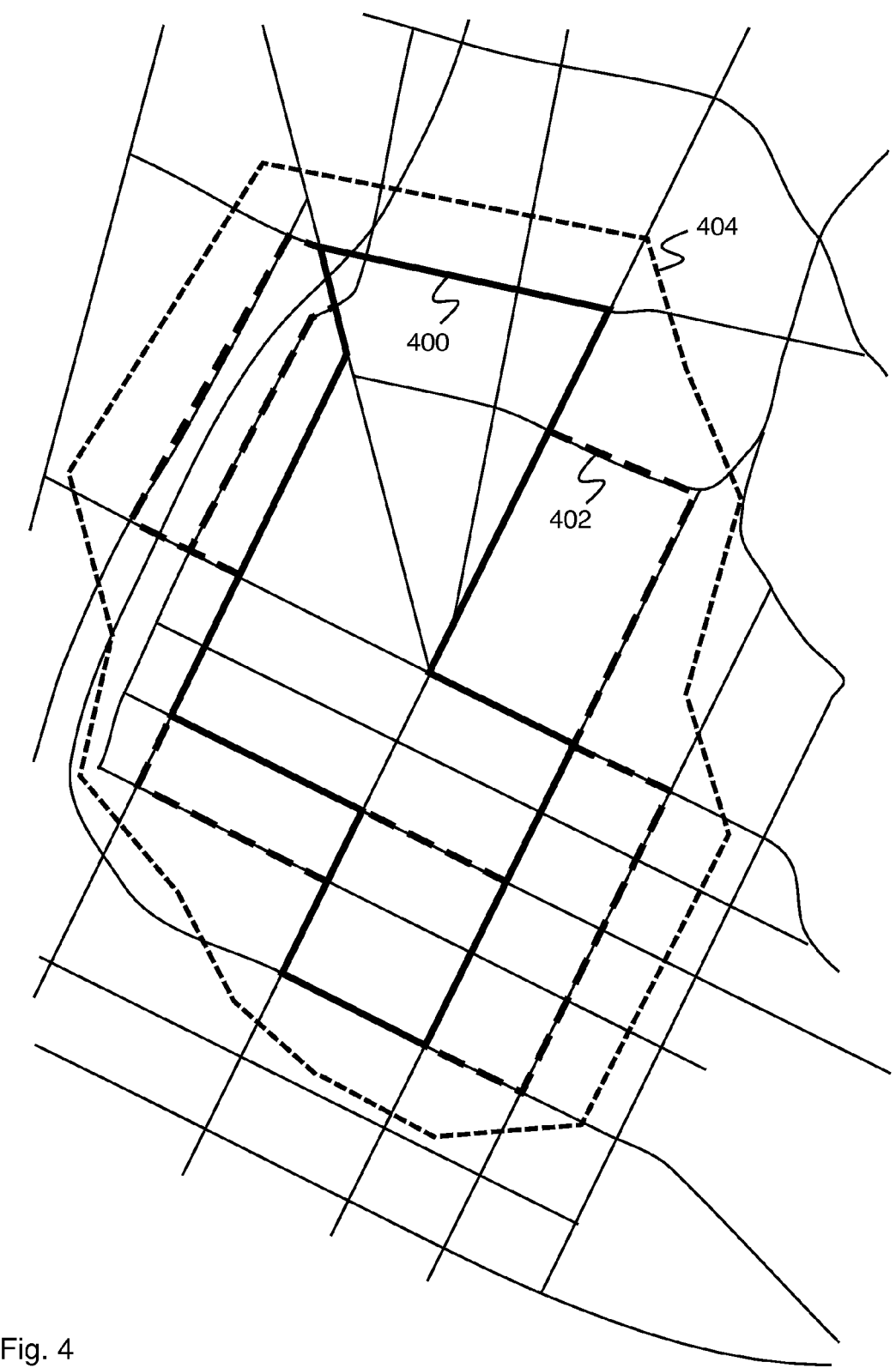
FIG. 4 is a diagram illustrating an embodiment of a map illustrating a determination of a perimeter geofence.

FIG. 4 is a diagram illustrating an embodiment of a map illustrating a determination of a perimeter geofence. In some embodiments, the map of FIG. 4 comprises map 200 of FIG. 2 with GPS data and a perimeter geofence shown. In the example shown, GPS data line 400 illustrates a main route for a commercial vehicle. In various embodiments, a main route comprises a predetermined route, a most common route, a preferred route, or any other appropriate main route. Dashed GPS data lines (e.g., dashed GPS data line 402) illustrate alternate route segments for the commercial vehicle (e.g., alternate route segments measured by the GPS that differ from the main route). The main route and all alternate route segments illustrate all routes measured to be traveled by the commercial vehicle over a given period of time (e.g., one week, one month, one year, etc.). Perimeter geofence 404 comprises a perimeter geofence demarcating the perimeter the commercial vehicle is allowed to travel within. In some embodiments, perimeter geofence 404 is determined by determining a perimeter that encloses the main route and all alternate route segments and adding a boundary region.

Figure 5:
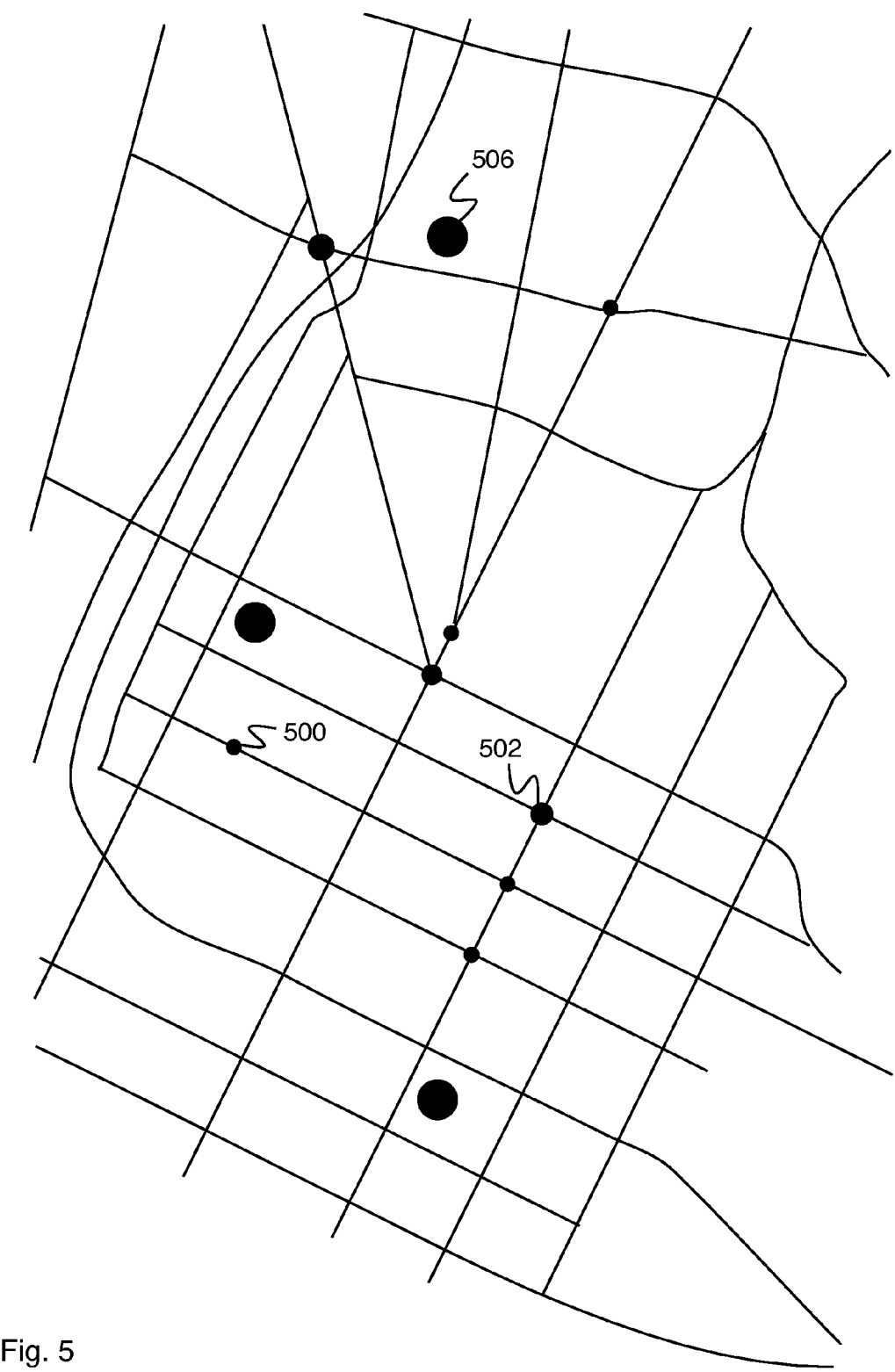
FIG. 5 is a diagram illustrating an embodiment of a map with groups of stopping locations.

FIG. 5 is a diagram illustrating an embodiment of a map with groups of stopping locations. In some embodiments, the map of FIG. 5 comprises map 200 of FIG. 2 with groups of stopping locations shown. In the example shown, dots shown on the map comprise groups of stopping locations (e.g., group of stopping locations 500, group of stopping locations 502, and group of stopping locations 506). In some embodiments, groups of stopping locations comprise representations of groups of stopping locations (e.g., a group of stopping locations is represented by a single dot on the map). The size of the dot shown on the map indicates the number of stopping locations represented by the group of stopping locations. A stopping location comprises a location corresponding to a commercial vehicle stopping along its route. In some embodiments, a commercial vehicle stopping is determined by a vehicle event recorder, a GPS recorder, an event data recorder, or any other appropriate system. In various embodiments, a commercial vehicle stops at a scheduled stop (e.g., at a yard, a depot, a dropoff or pickup of goods, etc.), at a traffic control device (e.g., a stop sign, a stop light), at a region of heavy traffic, or at any other appropriate location. When groups of stopping locations are used for the purpose of determining location geofences, it is not desired to place location geofences at locations of traffic control devices or regions of heavy traffic. Group of stopping locations 500 comprises a group of stopping locations at a region of heavy traffic. In some embodiments, it is determined that group of stopping locations 500 comprises a group of stopping locations at a region of heavy traffic because the group of stopping locations is not at a location of a traffic control device, and comprises a relatively small number of nodes (e.g., the vehicle stops in traffic at the location of group of stopping locations 500 sometimes, but not all the time). In some embodiments, a group of stopping locations is determined to be at a region of heavy traffic by comparing the location of the group of stopping locations with a predetermined set of known regions of heavy traffic. Group of stopping locations 500 is considerably smaller than group of stopping locations 506. Group of stopping locations 502 comprises a group of stopping locations at a region of a traffic control device (e.g., group of stopping locations 502 is located at an intersection known by the vehicle event recorder to have a traffic control device). Group of stopping locations 506 is determined to comprise a group of stopping locations at a scheduled stop. In some embodiments, it is determined that group of stopping locations 506 comprises a group of stopping locations at a scheduled stop because the group of stopping locations is not at a location of a traffic control device and comprises a relatively large number of stopping locations. In some embodiments, stopping locations shown in FIG. 5 are determined to be nodes. In some embodiments, stopping locations shown in FIG. 5 that are not at required stopping locations are determined to be nodes. In some embodiments, a group of nodes determined from a group of stopping locations is determined to be a cluster. In some embodiments, a location geofence is determined to be at the location of a cluster. In some embodiments, a location geofence is determined to be at the location of a group of stopping locations 506.

Figure 6:
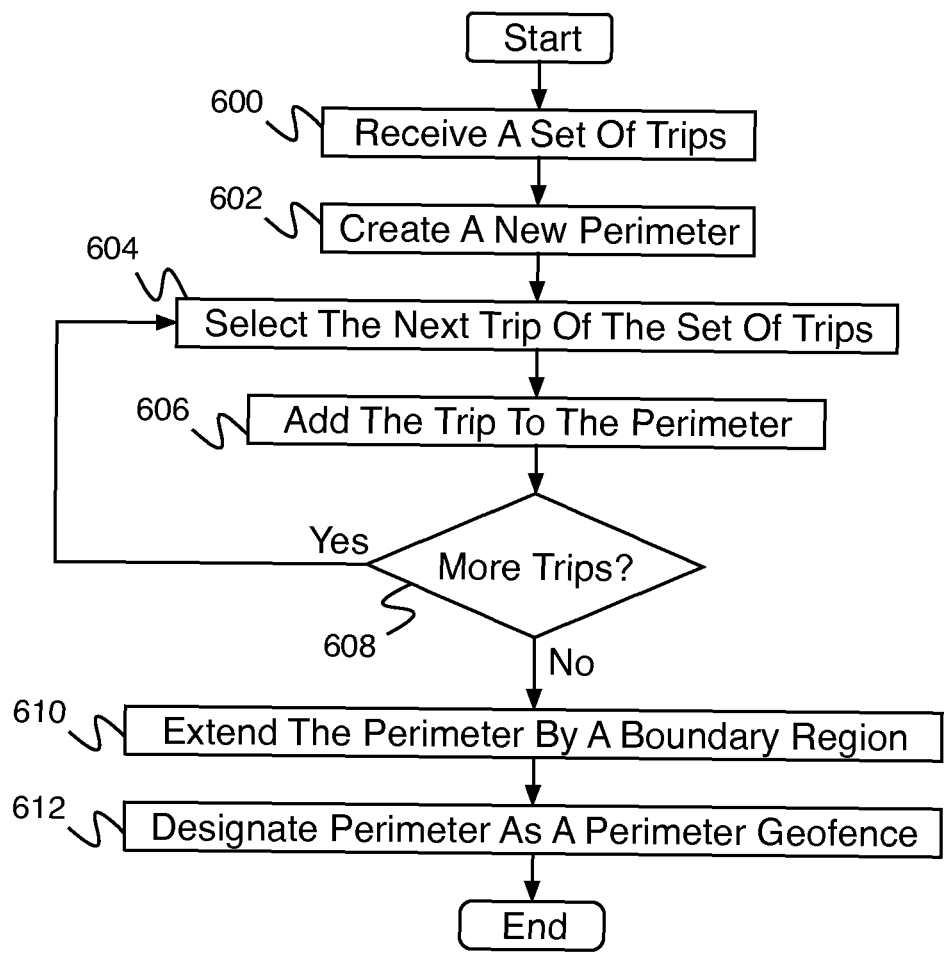
FIG. 6 is a flow diagram illustrating an embodiment of a process for determining a perimeter geofence.

FIG. 6 is a flow diagram illustrating an embodiment of a process for determining a perimeter geofence. In some embodiments, the process of FIG. 6 is used to determine perimeter geofence 404 of FIG. 4. In the example shown, in 600, a set of trips is received. In various embodiments, a trip comprises GPS data, event recorder data, video data, sensor data, or any other recorded data. In various embodiments, a trip comprises data recorded over the course of a single day, over the course of a shift, over the course of a loop (e.g., a delivery run and return, a bus loop, etc.), from when the vehicle is turned on until when it is turned off, or any other appropriate trip period. In some embodiments, GPS data is analyzed to determine a trip (e.g., beginning and ending at known starting and stopping locations—for example, yards or depots. In some embodiments, a trip is explicitly determined using input from driver (e.g., a received indication of the beginning and ending of a trip using a "start trip" button and an "end trip" button on an app running on a device in the vehicle). In various embodiments, the set of trips comprises a set of trips made over the course of one day, one week, one month, or any other appropriate period of time. In some embodiments, the set of trips comprises all trips made over a period of time. In some embodiments, the set of trips comprises a set of trips selected from the set of all trips made over a period of time (e.g., trips selected by a person or driver, trips selected by a computer, trips selected to only be within an appropriate perimeter, trips selected to cover a desired area, trips for one fleet, or any other appropriate set of trips). In various embodiments, one or more trips comprise one or more of the following: trips selected by a person, trips selected by a computer, trips selected to only be within an appropriate perimeter, trips selected to cover a desired area, or any other appropriate set of trips. In 602, a new perimeter is created (e.g., an empty perimeter). In 604, the next trip is selected of the set of trips. In some embodiments, the next trip comprises the first trip. In 606, the trip is added to the perimeter. In some embodiments, adding the trip to the perimeter comprises extending the perimeter to include the trip. In 608, it is determined whether the set of trips comprises more trips (e.g., more trips that have not already been added to the perimeter. In the event it is determined that the set of trips comprises more trips, control passes to 604. In the event it is determined that the set of trips does not comprise more trips, control passes to 610. In 610, the perimeter is extended by a boundary region. In some embodiments, a boundary region is added to ensure that the perimeter geofence does not fall on a vehicle route. In some embodiments, the boundary region comprises 10 feet, 100 feet, 1000 feet, 1 mile, 0.1% of the maximum perimeter width, 1% of the maximum perimeter width, or any other appropriate boundary region. In 612, the perimeter is designated as a perimeter geofence.

Figure 7:
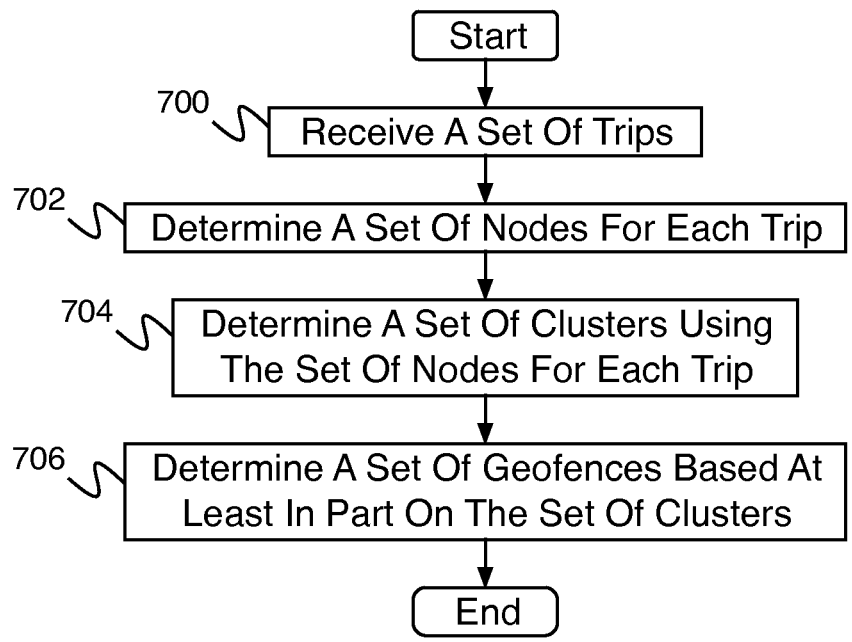
FIG. 7 is a flow diagram illustrating an embodiment of a process for determining location geofences.

FIG. 7 is a flow diagram illustrating an embodiment of a process for determining location geofences. In some embodiments, the process of FIG. 7 is used to determine location geofence 302 of FIG. 3, location geofence 304 of FIG. 3, and location geofence 306 of FIG. 3. In the example shown, in 700, a set of trips is received. In various embodiments, a trip comprises GPS data (e.g., position data), event recorder data, video data, sensor data, or any other recorded data. In various embodiments, a trip comprises data recorded over the course of a single day, over the course of a shift, over the course of a loop (e.g., a delivery run and return, a bus loop, etc.), from when the vehicle is turned on until when it is turned off (e.g., ignition on to ignition off), or any other appropriate trip period. In some embodiments, GPS data is analyzed to determine a trip (e.g., beginning and ending at known starting and stopping locations—for example, yards or depots. In various embodiments, the set of trips comprises a set of trips made over the course of one day, one week, one month, or any other appropriate period of time. In some embodiments, the set of trips comprises all trips made over a period of time. In some embodiments, a trip comprises travel within a driver's shift. In 702, a set of nodes is determined for each trip. In some embodiments, a node of the set of nodes comprises a stop location. In some embodiments, a stop location comprises a location where a vehicle is determined to be in a fixed position for at least a predetermined period of time). The stop location is determined from the trip data. In some embodiments, the stop location is determined from position data (e.g., from GPS data). In some embodiments, the stop location is based at least in part on event data. In some embodiments, nodes are determined at stop locations that are not at traffic stopping locations (e.g., stop signs, stop lights, regions of heavy traffic, etc.). In 704, a set of clusters is determined using the set of nodes for each trip. In some embodiments, clusters are determined by combining each set of nodes into a single combined set of nodes and designating clusters at locations of groups of nodes separate from other groups of nodes in the combined set of nodes. In some embodiments, a group of nodes is determined to be separate from other groups of nodes if distances between all nodes of the group of nodes and all nodes outside the group of nodes are above a threshold, if the node density drops below a threshold around the group of nodes, if the node density forms an inflection point around the group of nodes, or in any other appropriate way. In 706, a set of geofences is determined based at least in part on the set of clusters. In various embodiments, a geofence is determined corresponding to each cluster, corresponding to clusters with more than a threshold number of nodes (e.g., three nodes, five nodes, etc.), corresponding to clusters with more than a threshold fraction of nodes (e.g., a number of nodes greater than 50% of the number of trips, a number of nodes greater that 75% of the number of trips, etc.), or corresponding to clusters in any other appropriate way. In some embodiments, a geofence is determined from a cluster of nodes by placing a boundary region around each node in the cluster (e.g., a circle with a radius of 10 feet) and determining the union of the set of boundary regions.

Figure 8:
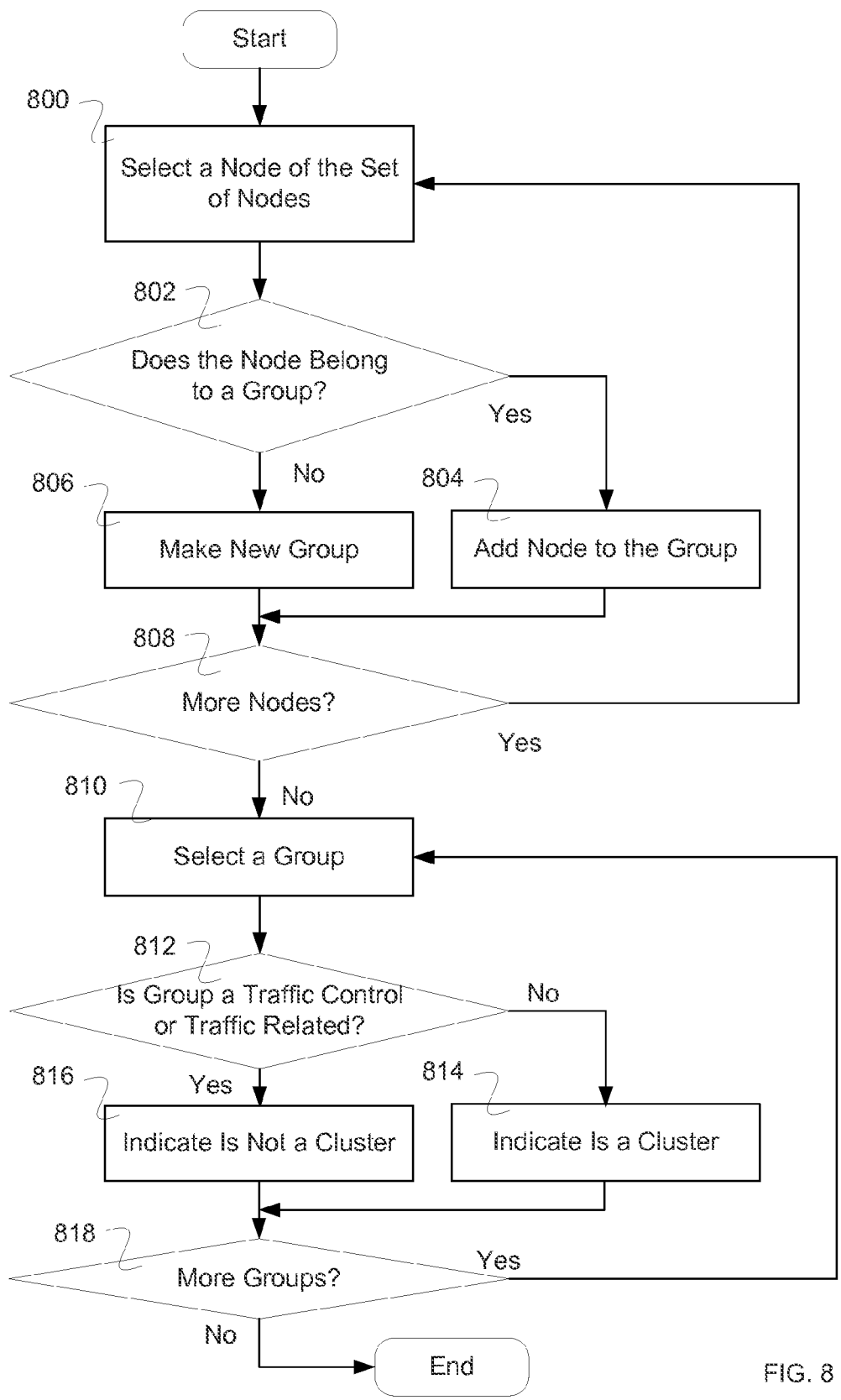
FIG. 8 is a flow diagram illustrating an embodiment of a process for determining clusters.

FIG. 8 is a flow diagram illustrating an embodiment of a process for determining clusters. In some embodiments, the process of FIG. 8 is used to implement 704 of FIG. 7. In the example shown, in 800 a node is selected of the set of nodes. For example, one of the nodes of the set of nodes as received as being part of a trip of a vehicle. In 802, it is determined whether the node belongs to a group. In the event that it is determined that the node belongs to a group, in 804 the node is added to the group. For example, a node is located geographically at a similar location (e.g., within a limit distance of any other node in the group) or a node is in the same sequence along a trip route. In various embodiments, a node belongs to a group of nodes when one of the following is satisfied: distances between all nodes of the group of nodes and all nodes outside the group of nodes are above a threshold, the node density drops below a threshold around the group of nodes, the node density forms an inflection point around the group of nodes, or any other appropriate criteria for a node belonging to a group. In the event that it is determined that the node does not belong to a group, in 806 the node is made into a new group. For example, the node is allocated to a new group. In 808, it is determined whether there are more nodes. In the event there are more nodes, control passes to 800. In the event that there are no more nodes, in 810 a group is selected. In 812, it is determined whether a group is traffic control or traffic related. For example, is the group related to a stop sign, stop light, highway merge, traffic bottleneck, etc. In the event that the group is not related to traffic control or to traffic, in 814 indicate that the group is a cluster. In the event that the group is related to traffic control or to traffic, in 816 indicate that the group is not a cluster. In 818, it is determined whether there are more groups. In the event that there are more groups, control passes to 810. In the event that there are not more groups, the process ends.

In various embodiments, geofences are determined using a statistical algorithm such as classification, regression, association, or any other appropriate algorithm.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatic geofence determination, comprising: an interface configured to receive a plurality of data samples collected during one or more trips; and a processor configured to: determine a set of nodes for the one or more trips, wherein members of the set of nodes are those data samples of the plurality of data samples sharing a characteristic; determine a cluster, wherein members of the cluster are nodes within a threshold distance of each other; determine a geofence, wherein a location and a size of the geofence is defined based on a location and a size of the cluster; and output the determined geofence for display on a display device.

2. The system of claim 1, wherein the characteristic includes stopping at a stop location.

3. The system of claim 2, wherein the stop location is determined based at least in part on event data, the event data indicating a state of a vehicle.

4. The system of claim 2, wherein the stopping occurs other than at a required traffic stopping location.

5. The system of claim 4, wherein the required traffic stopping location comprises a location associated with a stop sign.

6. The system of claim 4, wherein the required traffic stopping location comprises a location associated with a stop light.

7. The system of claim 4, wherein the required traffic stopping location comprises a region characterized by traffic above a first threshold.

8. The system of claim 1, wherein a trip of the one or more trips comprises a loop of travel.

9. The system of claim 1, wherein a trip of the one or more trips comprises travel from vehicle ignition on to vehicle ignition off.

10. The system of claim 1, wherein a trip of the one or more trips comprises travel within a pre-definable period of time.

11. The system of claim 1, wherein a trip of the one or more trips comprises travel within a driver's shift.

12. The system of claim 1, wherein the characteristic shared by the members of the set of nodes is a distance between members of the set of nodes and nodes outside the set of nodes being above a second threshold.

13. The system of claim 1, wherein the determining the geofence includes placing a boundary region around each node in the cluster and determining the union of the set of boundary regions.

14. A method for automatic geofence determination, comprising: receiving a plurality of data samples collected during one or more trips; determining, using a processor, a set of nodes for the one or more trips, wherein members of the set of nodes are those data samples of the plurality of data samples sharing a characteristic; determining, using the processor, a cluster, wherein members of the cluster are nodes within a threshold distance of each other; determining, using the processor, a geofence, wherein a location and a size of the geofence is defined based on a location and a size of the cluster; and outputting, using the processor, the determined geofence for display on a display device.

15. A computer program product for automatic geofence determination, the computer program product being embodied in a non-transitory computer readable storage medium and comprising computer instructions for: receiving a plurality of data samples collected during one or more trips; determining, using a processor, a set of nodes for the one or more trips, wherein members of the set of nodes are those data samples of the plurality of data samples sharing a characteristic; determining, using the processor, a cluster, wherein members of the cluster are nodes within a threshold distance of each other; determining, using the processor, a geofence, wherein a location and a size of the geofence is defined based on a location and a size of the cluster; and outputting, using the processor, the determined geofence for display on a display device.

16. A system for automatic geofence determination, comprising: an interface configured to receive position data for one or more trips; and a processor configured to: add each trip to a perimeter; extend the perimeter by a boundary region to include an area traveled during the trip; determine a geofence based at least in part on the perimeter; and output the determined geofence for display on a display device.

17. The system of claim 16, wherein the one or more trips comprise one or more of the following: trips selected by a person, trips selected by a computer, trips selected to only be within an appropriate perimeter, or trips selected to cover a desired area.

18. The system of claim 1, wherein the characteristic shared by the members of the set of nodes is the node density drops below a third threshold around the set of nodes.

19. The system of claim 1, wherein the characteristic shared by the members of the set of nodes is the node density forms an inflection point around the set of nodes.

20. The system of claim 1, wherein the plurality of data samples collected during the one or more trips includes at least one of: global positioning system data and vehicle event data.

* * * * *